(12) United States Patent
Hedtke (10) Patent No.: US 8,299,938 B2
(45) Date of Patent: Oct. 30, 2012

(54) PROJECTED INSTRUMENT DISPLAYS FOR FIELD MOUNTED PROCESS INSTRUMENTS

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 596 days.

(21) Appl. No.: 12/555,582

(22) Filed: Sep. 8, 2009

(65) Prior Publication Data

US 2011/0057811 A1    Mar. 10, 2011

(51) Int. Cl.
*G08C 15/06* (2006.01)

(52) U.S. Cl. ..................... 340/870.02; 73/431

(58) Field of Classification Search ............. 340/870.02, 340/538, 539, 12.3; 73/431; 702/141, 182; 700/21; 455/67.11, 423
See application file for complete search history.

(56) References Cited

U.S. PATENT DOCUMENTS

| | | |
|---|---|---|
| 4,218,111 A | 8/1980 | Withrington et al. |
| 4,309,070 A | 1/1982 | St. Leger Searle |
| 4,550,977 A | 11/1985 | Inoue et al. |
| 4,613,200 A | 9/1986 | Hartman |
| 4,711,544 A | 12/1987 | Iino et al. |
| 4,763,990 A | 8/1988 | Wood |
| 4,787,040 A | 11/1988 | Ames et al. |
| 4,787,711 A | 11/1988 | Suzuki et al. |
| 4,790,613 A | 12/1988 | Moss |
| 4,886,328 A | 12/1989 | Iino |
| 4,973,132 A | 11/1990 | McDonald et al. |
| 5,013,135 A | 5/1991 | Yamamura |
| 5,048,077 A | 9/1991 | Wells et al. |
| 5,066,099 A | 11/1991 | Yoshida et al. |
| 5,157,549 A | 10/1992 | Suzuki et al. |
| 5,210,624 A | 5/1993 | Matsumoto et al. |
| 5,212,471 A | 5/1993 | McDonald |
| 5,229,754 A | 7/1993 | Aoki et al. |
| 5,231,379 A | 7/1993 | Wood et al. |
| 5,243,448 A | 9/1993 | Banbury |
| D342,456 S | 12/1993 | Miller et al. |
| 5,289,315 A | 2/1994 | Makita et al. |
| 5,313,292 A | 5/1994 | Wood et al. |
| 5,313,326 A | 5/1994 | Ramsbottom |
| 5,329,272 A | 7/1994 | Massarelli et al. |
| 5,379,132 A | 1/1995 | Kuwayama et al. |
| 5,414,439 A | 5/1995 | Groves et al. |
| 5,422,812 A | 6/1995 | Knoll et al. |
| 5,473,466 A | 12/1995 | Tanielian et al. |
| 5,486,840 A | 1/1996 | Borrego et al. |
| 5,495,769 A | 3/1996 | Broden et al. |
| 5,686,832 A | 11/1997 | Ayres et al. |

(Continued)

OTHER PUBLICATIONS

"O'Brien J-Line Jacketed Tubing" brochure, Feb. 4, 2003, 2 pages.

(Continued)

*Primary Examiner* — Joseph Lauture
(74) *Attorney, Agent, or Firm* — Kinney & Lange, P.A.

(57) ABSTRACT

An industrial process transmitter includes a first process sensor, transmitter circuitry, a housing and an image projector. The first process sensor measures a process variable of an industrial process and generates a sensor signal. The transmitter circuitry is connected to the first process sensor and is configured to operate functions of the process transmitter. The housing includes a window and an image projector. The image projector is connected to the transmitter circuitry and is configured to project an image of information relating to functions of the process transmitter onto the window in the housing.

21 Claims, 4 Drawing Sheets

U.S. PATENT DOCUMENTS

| | | | |
|---|---|---|---|
| 5,724,189 | A | 3/1998 | Ferrante |
| 5,812,332 | A | 9/1998 | Freeman |
| 5,859,714 | A | 1/1999 | Nakazawa et al. |
| 6,147,801 | A | 11/2000 | Goldenberg et al. |
| D439,181 | S | 3/2001 | Fandrey et al. |
| 6,346,929 | B1 | 2/2002 | Fukushima et al. |
| 6,489,934 | B1 | 12/2002 | Klausner |
| 6,504,518 | B1 | 1/2003 | Kuwayama et al. |
| D477,598 | S | 7/2003 | Mathiowetz et al. |
| 7,134,354 | B2 | 11/2006 | Nelson et al. |
| 7,164,355 | B2 | 1/2007 | Schnaare et al. |
| 7,199,784 | B2 | 4/2007 | Mathiowetz et al. |
| 7,222,049 | B2 | 5/2007 | Schumacher |
| 7,360,905 | B2 | 4/2008 | Davis et al. |
| 7,446,931 | B2 | 11/2008 | Miller |
| 7,509,220 | B2 | 3/2009 | Hedtke |
| 2002/0063855 | A1 | 5/2002 | Williams |
| 2003/0191381 | A1 | 10/2003 | Luce |
| 2003/0220733 | A1 | 11/2003 | Akins et al. |
| 2005/0192727 | A1 | 9/2005 | Shostak et al. |
| 2005/0258959 | A1 | 11/2005 | Schnaare et al. |
| 2006/0148410 | A1* | 7/2006 | Nelson et al. .............. 455/67.11 |
| 2007/0008293 | A1 | 1/2007 | Oldrey |
| 2007/0121085 | A1 | 5/2007 | Dewald |
| 2007/0153350 | A1 | 7/2007 | Yun |
| 2007/0233376 | A1 | 10/2007 | Gershony et al. |
| 2008/0037090 | A1 | 2/2008 | Miller et al. |
| 2008/0084511 | A1 | 4/2008 | Moizio et al. |
| 2008/0109132 | A1 | 5/2008 | Yukawa et al. |
| 2008/0122991 | A1 | 5/2008 | Chen |
| 2008/0158669 | A1 | 7/2008 | O'Keefe et al. |
| 2008/0186414 | A1 | 8/2008 | Pan |
| 2008/0223140 | A1 | 9/2008 | Broden |
| 2009/0009719 | A1 | 1/2009 | Ryf |
| 2009/0046140 | A1 | 2/2009 | Lashmet et al. |

OTHER PUBLICATIONS

"O'Brien S-Line Preinsulated Tubing" brochure, Feb. 10, 2007, 1 page.

"O'Brien Tracepak" brochure, Nov. 1, 2006, 16 pages.

Sittler, Fred et al., "Process Variable Transmitter With Acceleration Sensor," Aug. 6, 2007, U.S. Appl. No. 11/834,221.

"Tracepak Bundles for Instrument Impulse Lines" from: http://www.obcorp.com/webpages/TubingBundles/TXinstru.htm, visited Apr. 30, 2008, 3 pages.

"Advantage of Electric Tracers" from: www.obcorp.com/WebPages/TubingBundles/TXadelec.htm, visited Apr. 30, 2008, 3 pages.

"Tracepak and Heated Hose Introduction" from: http:www.obcorp.com/WebPages/TubingBundles/TXHH:htm, visited Apr. 30, 2008, 3 pages.

International Search Report and Written Opinion for Application Serial No. PCT/US2010/002254, filed Aug. 16, 2010.

* cited by examiner

PROJECTED INSTRUMENT DISPLAYS FOR FIELD MOUNTED PROCESS INSTRUMENTS

BACKGROUND

This invention relates generally to industrial process control systems having process instruments. More particularly, the present invention relates to process instruments having local display means for outputting information relating to functions of the process instrument.

Process instruments are used to monitor process variables, such as pressure, temperature, flow and level, of process fluids used in industrial processes. For example, process transmitters are typically employed in industrial manufacturing facilities at multiple locations to monitor a variety of process variables along various production lines. Process transmitters include sensors that produce an electrical output in response to physical changes in the process. For example, pressure transmitters include pressure transducers that produce an electrical output as a function of the pressure of a process fluid, such as in water lines, chemical tanks or the like. Each process transmitter also includes transmitter electronics for receiving and processing the electrical output of the sensor so that the transmitter and process can be monitored remotely or locally. Remotely monitored transmitters include electronics that transmit the electrical output over a control loop or network to a central monitoring location such as a control room. With remote monitoring, the process can be automatically regulated from the control room by including automated switches, valves, pumps and other similar components in the process control system and the control loop. Locally monitored transmitters include displays, such as liquid crystal display (LCD) screens, that show the electrical output at the site of the process transmitter. With local monitoring, the process can be manually regulated in the field by operators reacting to information obtained from the transmitter.

For both locally and remotely monitored transmitters, it is desirable to view information relating to operation of the process and the transmitter at the site of the transmitter. For example, operators and repair personnel often require real-time information such that obtaining information from a control room is inconvenient. As such, transmitters are capable of being equipped with local displays, which typically comprise an LCD. Conventional displays are limited in the variety of information they are capable of displaying. Furthermore, transmitter electronics typically include a transmitter-specific interconnection that allows an LCD module to be linked to the electronics using various types of mechanical and electrical connections. LCD modules also vary in size of the display, power requirements and software interfaces. This divergence in display technology results in increased manufacturing costs as many different LCD modules need to be designed and built or purchased. There is, therefore, a need for a local display means that is universally applicable across a wide variety of transmitter types and electronics platforms.

SUMMARY

The present invention is related to an industrial process transmitter having a projected instrument display. The industrial process transmitter includes a first process sensor, transmitter circuitry, a housing and an image projector. The first process sensor measures a process variable of an industrial process and generates a sensor signal. The transmitter circuitry is connected to the first process sensor and is configured to operate functions of the process transmitter. The housing includes a window and the image projector. The image projector is connected to the transmitter circuitry and is configured to project an image of information relating to functions of the process transmitter onto the window in the housing.

DETAILED DESCRIPTION

Figure 1:
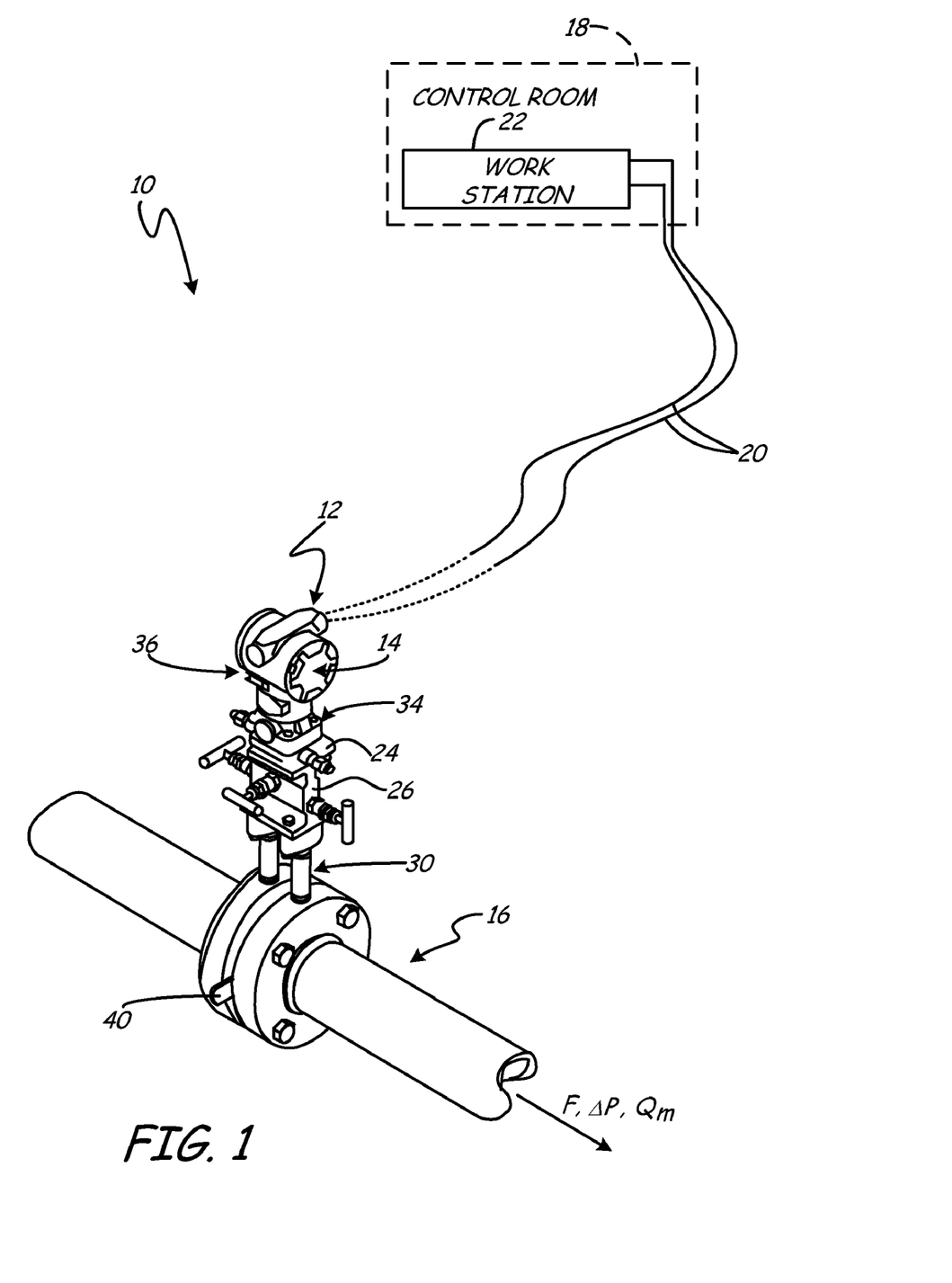
FIG. 1 shows a process control system having a process transmitter connected to a process fluid source and a control room.

FIG. 1 shows process control system 10 of the present invention having process transmitter 12 with projected instrument display 14 of the present invention. Process control system 10 includes process transmitter 12, piping 16 and control room 18. Control room 18, which is connected to transmitter 12 with control loop 20, includes work station 22. Work station 22 includes various components for interacting with transmitter 12 such as a power supply and communications interfaces. Process transmitter 12 is connected to a process source, such as piping 16, to generate signals relating to process variables of process fluid F, such as differential pressure $\Delta P$. Process transmitter 12, which also includes various temperature sensors, is capable of performing analysis of the process variables to determine process conditions, such as mass flow rate $Q_m$, of fluid F. Transmitter 12 communicates information relating to the process variables to control room 18 over control loop 20. Transmitter 12, however, includes projected instrument display 14, which enables information relating to operation of transmitter 12, process fluid F, process variable $\Delta P$ and process condition $Q_m$ to be displayed locally in a variety of configurations. Although described hereafter with respect to a differential pressure transmitter, projected instrument display 14 comprises a universal display means that is adaptable for use across different types of transmitters, such as pressure, temperature, flow, level and multi-variable transmitters.

Process transmitter 12 is coupled to piping 16, through which process fluid F flows, using process flange 24, manifold 26 and impulse piping 30. Process transmitter 12 includes sensor module 34 and transmitter electronics module 36. Process flange 24, which adapts pressure sensor module 34 for coupling with the process control system 10, connects transmitter 12 to manifold 26, which allows transmitter 12 to be isolated from process fluid F for calibration, testing, and maintenance, etc. Differential pressure $\Delta P$ is produced within the flow of process fluid F by primary element 40, which in the embodiment shown comprises an orifice plate. The orifice plate includes a bore having a diameter smaller than that of piping 16 to produce a flow restriction. Relatively higher and lower pressures on either side of orifice plate 40 are communicated through impulse piping 30, manifold 26 and flange 24 to sensor module 34. Sensor module 34 includes a differential pressure sensor for sensing differential pressure ΔP. Sensor module 34 generates electrical signals based on output from the differential pressure sensor, and transmits the signals to transmitter electronics module 36.

Transmitter electronics module 36 includes electrical components for transmitting the electrical signals over control loop 20 to control room 18. In one embodiment, process transmitter 12 communicates digitally with control room 18 over a wireless or wired network, such as over a HART®, WirelessHART® or FOUNDATION™ Fieldbus network protocol. In other embodiments, process transmitter 12 is a two-wire transmitter for operating on a 4-20 mA loop. Control loop 20 also enables control room 18 to transmit data to and receive data from process transmitter 12 utilizing work station 22. Work station 22 includes a digital processor that can manipulate data relating to transmitter 12, such as process variables ΔP. Additionally, work station 22 includes interface means, such as a keyboard, that permit control over transmitter 12. Work station 22 can display information in a variety of formats, based on software stored in work station 22. Thus, information relating to process variables and process conditions, such as ΔP and $Q_m$, can be viewed in configurations that are most conducive to obtaining useful information. Information can also be obtained locally from transmitter 12 through use of a conventional field communication device.

It is, however, desirable for maintenance personnel and operators to be able to receive information from transmitter 12 in the field, such as at the location of piping 16, without the use of control room 18 or additional equipment. Transmitter 12 of the present invention utilizes projected instrument display 14 that enables complete customization of the output of transmitter 12 for local viewing. Projected instrument display 14 can be customized for use across the spectrum of transmitter types and electronics architectures. Projected instrument display 14 also features a customizable local operator interface (LOI) to access various information concerning transmitter 12. Thus, information from transmitter 12 can be programmed and accessed using control room 18, a handheld field communicator or from display 14 using an LOI.

Figure 2:
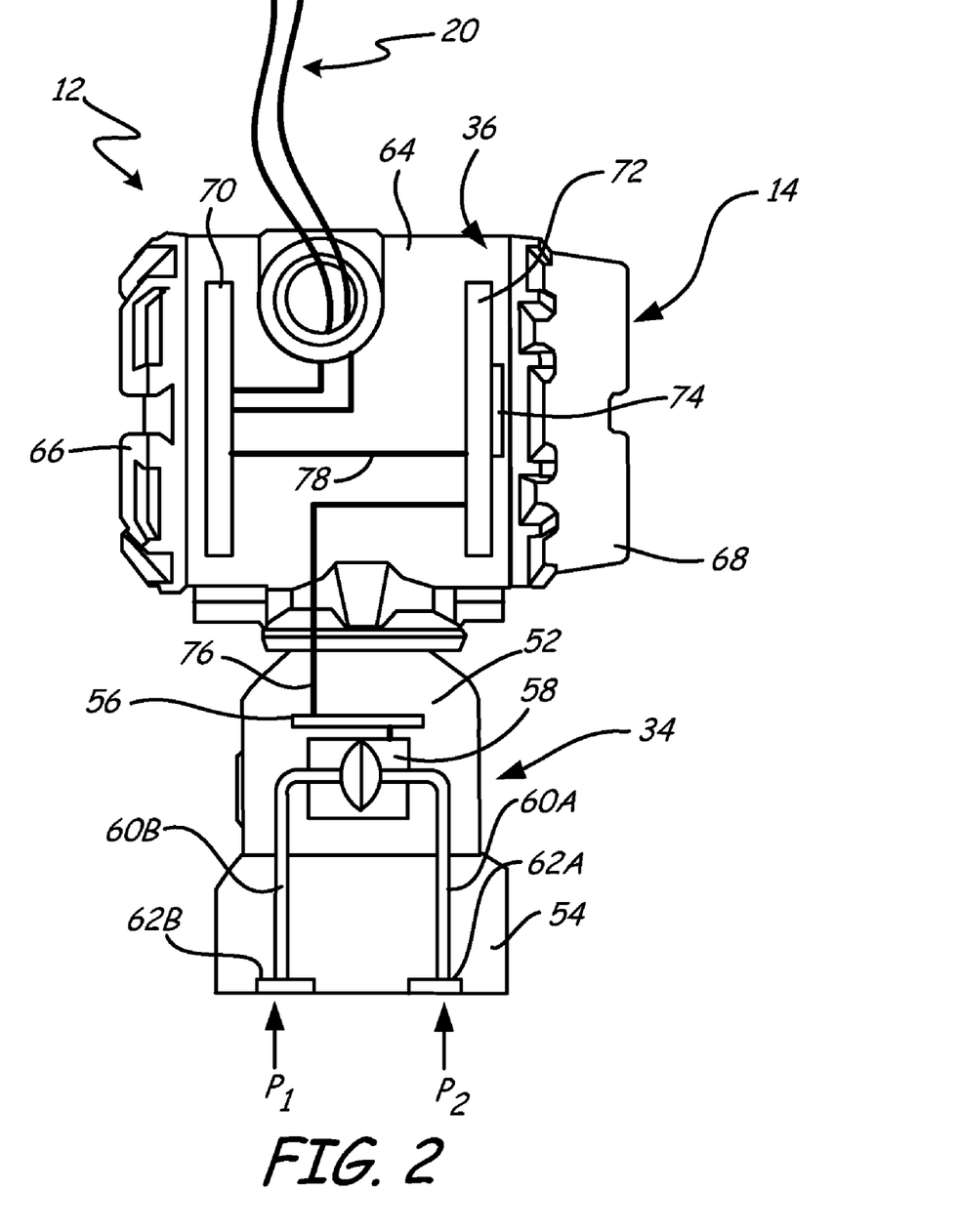
FIG. 2 is a schematic side view of the process transmitter of FIG. 1 showing transmitter electronics having a local display means comprising an image projector.

According to one embodiment, FIG. 2 schematically shows pressure transmitter 12 having projected instrument display 14, sensor module 34 and transmitter electronics module 36. Sensor module 34 includes housing 52 and base 54, in which are disposed sensor board 56, pressure sensor 58, isolation tubes 60A and 60B and isolation diaphragms 62A and 62B. Transmitter electronics module 36 includes housing 64, cover 66, display cover 68, terminal block 70, transmitter circuitry 72 and projector 74. Base 54 of sensor module 34 is connected to flange 24 (FIG. 1), such as with threaded fasteners. Sensor board 56 and sensor 58 are mounted within housing 52 of sensor module 34. Housing 52 of sensor module 34 connects to housing 64 of electronics module 36 through, for example, a threaded connection. Similarly, covers 66 and 68 are connected to housing 64 through threaded connections that form flame-quenching seals, as are known in the art, to prevent escape of flames from within housing 64. Thus, covers 66 and 68 are removable from housing 64. Terminal block 70 and transmitter circuitry 72 are mounted to housing 64 within transmitter electronics module 36. Projector 74 is mounted to transmitter circuitry 72 such that output of transmitter circuitry 72 can be projected onto display cover 68.

In the embodiment shown, sensor 58 comprises a capacitance-based differential pressure cell having a sensing diaphragm disposed between a pair of electrode plates, as is known in the art. Sensor 58 is connected to base 54 with isolation tubes 60A and 60B, in which is disposed a hydraulic fill fluid. Isolation diaphragms 62A and 62B separate the fill fluid within isolation tubes 60A and 60B from pressures $P_1$ and $P_2$ of process fluid F. Thus, a physical change in the pressure of process fluid F is sensed by sensor 58 through isolation diaphragms 62A and 62B within base 54 and the hydraulic fill fluid within isolation tubes 60A and 60B. Sensor 58 is in electronic communication with sensor board 56. Sensor board 56 is in electronic communication with transmitter circuitry 72 through sensor cable 76, which typically comprises a ribbon cable. Transmitter circuitry 72 is in electronic communication with terminal block 70 through electronics interface 78.

Transmitter circuitry 72 conditions and manipulates the output of sensor board 56 into a format compatible with external communication systems, such as control loop 20 and other wired or wireless communications protocols. In other embodiments, sensor board 56 performs conditioning of the sensor signal for communication over the control loop. Transmitter circuitry 72 is configured based on the application for which it is used and the specific type of transmitter, i.e. pressure, temperature, flow, etc., in which it is used. A transmitter can be configured by the factory, with a handheld field communicator, with an LOI or with a control system. Numerous parameters are configurable and can be displayed. These include process variables (pressure, percent of range, sensor temperature, etc.); device tests (calibration, loop test, etc.); and device set up information (tag number, unit of measure, damping, etc.). Projector 74 can be mounted to any configuration of transmitter circuitry 72, regardless of its specific configuration. Thus, projector 74 enables customizable data relating to any process variable (such as ΔP), process condition (such as $Q_m$) or transmitter 12 be displayed at electronics module 36 without the need of a customized LCD module.

Figure 3:
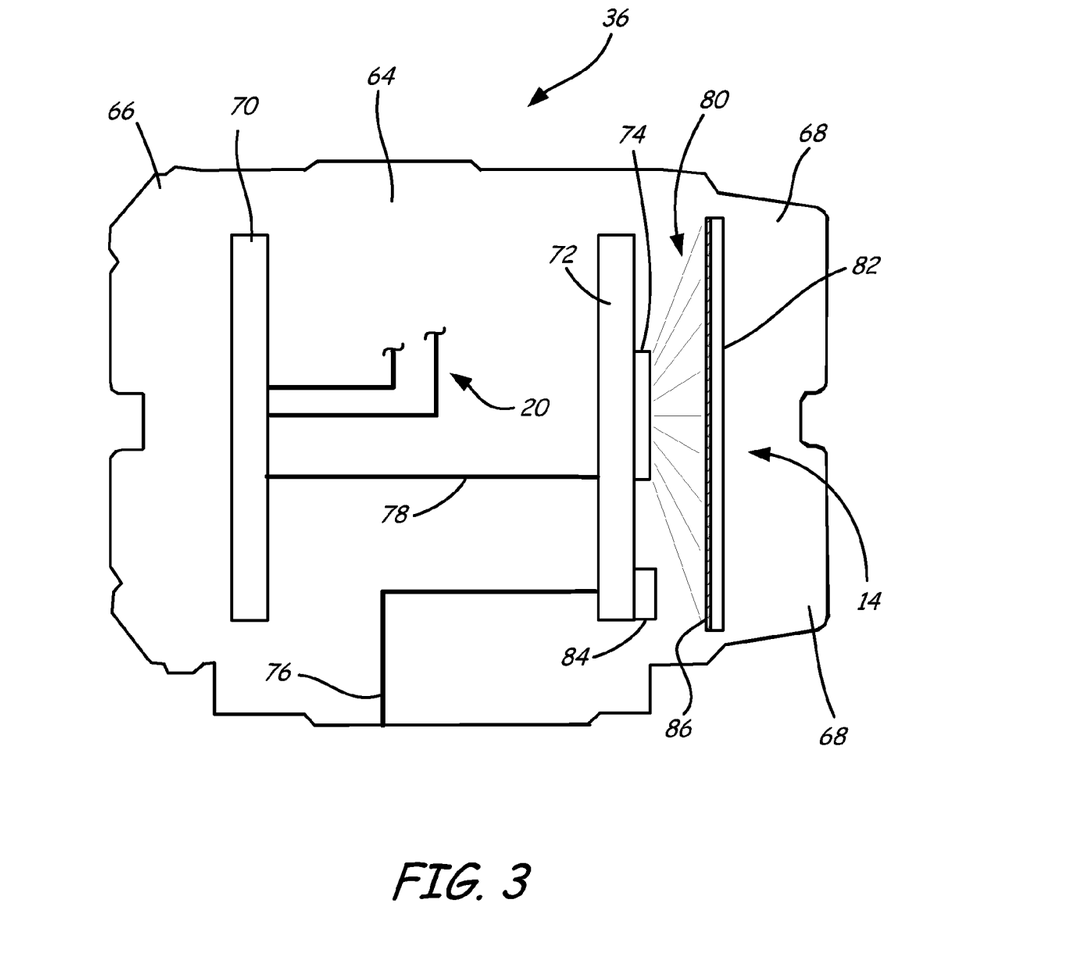
FIG. 3 is a schematic of the transmitter electronics of FIG. 2 showing an image projector projecting information onto a transmitter cover.

FIG. 3 is a schematic of transmitter electronics module 36 of FIG. 2 showing image projector 74 projecting an image of information 80 onto glass 82 of display cover 68. Transmitter electronics module 36 includes housing 64, to which cover 66 and display cover 68 are connected. Terminal block 70 is disposed within housing 64 to connect transmitter 12 to control room 18 (FIG. 1) using control loop 20. Transmitter circuitry 72 is disposed within housing 64 and is connected to terminal block 70 and sensor board 56 within sensor module 34 (FIG. 2). Transmitter circuitry 72 is connected to projector 74 and includes one or more buttons 84, as well as other components and software for receiving, conditioning and compensating sensor signals from sensor board 56. For example, transmitter circuitry 72 may include various temperature sensors for sensing a temperature within module 36 to perform temperature compensation calculations. In other embodiments, sensor board 56 includes temperature sensors and performs temperature compensation and other conditioning functions on the sensor signal.

Although described with respect to a specific material, glass 82 may comprise any transparent or semi-transparent material, such as plastic, which can form a window onto which information 80 can be projected and viewed from outside of housing 64. Glass 82, which includes coating 86, is mounted to display cover 68 to be in close proximity to transmitter circuitry 72 when display cover 68 is fully threaded into housing 64. However, the spacing between glass 82 and transmitter circuitry 72 is exaggerated in FIG. 3 such that the operation and benefits of the present invention are better understood. For example, FIG. 3 shows display cover 68 comprising an extended cover typically used to accommodate LCD modules. However, display cover 68 can be extended or recessed any length to adjust the distance between projector 74 and glass 82.

In one embodiment, transmitter circuitry 72 includes a printed wiring assembly (PWA). Transmitter circuitry 72 receives a variety of inputs through cable 76, which is connected to sensor board 56 in sensor module 34. After conditioning such inputs, transmitter circuitry 72 coordinates transmission of such signals over control loop 20 by passing the signals to terminal block 70 using interface 78. As such, the sensor signals can be manipulated in any desirable way at control room 18. However, it is desirable to display information at the site of transmitter 12 in a variety of ways. Projector 74 permits data relating to functions of transmitter 12, such as pressure data, temperature data or network and device data, to be presented on glass 82. Thus, the information can be changed upon demand by an operator using work station 22, a field communicator or a local operator interface (LOI). Furthermore, due to its compact size, projector 74 can be easily mounted to any configuration of transmitter circuitry 72 for use with any type of sensor or transmitter.

Projector 74 comprises any projector as is known in the art. Projector 74 emits a form of light that is incident on glass 82 of display cover 68. Alternatively, cover 68 can be removed from housing 64 such that light emitted from projector 74 can be directed outside of transmitter 12 for display on an appropriate surface. Light from projector 74 is emitted such that it disperses across all, or substantially all, of glass 82. Preferably, coating 86 is applied to the interior surface of glass 82 to provide a medium upon which the emitted light is incident to facilitate viewing of information 80 from outside of transmitter 12. In one embodiment of the invention, projector 74 utilizes rear projection technology. For example, in one embodiment, projector 74 comprises a liquid crystal display (LCD) engine in which light is incident onto a microchip that generates the information. In another embodiment, projector 74 comprises a light emitting diode (LED) that uses a digital light processing (DLP) microchip to produce the information. In other embodiments, projector 74 utilizes one or more laser light sources to produce the information. For such embodiments of projector 74, coating 86 of glass 82 comprises a laminar material that focuses light onto itself. For example, typical rear projection systems use a double lenticular screen in which a rear Fresnel lens receives light from a projector and distributes the light onto a front lenticular surface that focuses the light into viewable segments. Such screens are well known in the art and are described in U.S. Pat. No. 5,066,099 to Yoshida et al., which is assigned to Hitachi, Ltd., and U.S. Pat. No. 6,147,801 to Goldenberg et al., which is assigned to Philips Electronics North America Corp.

State of the art projectors are currently being used in head-up display devices, mobile phones and mobile media projectors. For example, the Aiptek PocketCinema® V10 and the WowWee™ Cinemin® media projectors comprise pocket-sized portable media projectors. The Samsung® MBP200 and the Toshiba® TDP-F10U projectors comprise pico-projectors suitable for use in hand-held devices. These devices use projection engines such as the Texas Instruments® DLP display engine, the 3M® MM200 display engine, or the MicroVision® PicoP® display engine, which are suitable for use in projector 74. For example, MicroVision® offers MEMS-based (Micro-Electro-Mechanical Systems) projectors that utilize various light sources and can be incorporated into portable hand-held devices, as is described in U.S. Pat. App. Nos. 2008/0037090 to Miller et al. Compact projection technology utilizing LED light sources available from Texas Instruments® is described in U.S. Pat. No. 7,360,905 to Davis et al. Image projectors using laser light sources are described in U.S. Pat. App. No. 20098/0009719 to Ryf, which is assigned to Lucent Technologies Inc., U.S. Pat. App. No. 2007/0153350 to Yun, which is assigned to Samsung Electro-Mechanics Co., Ltd., and U.S. Pat. No. 7,446,931 to Miller, which is assigned to Microvision, Inc. Such products and technology demonstrate the continued evolution of projector technology and the reduction in size of projection engines used to generate the projected image.

The MM200 projection engine available from 3M® utilizes a LCoS (liquid crystal on silicon) projector and an LED (light emitting diode) light source that lasts up to 10,000 hours. The MM200 projector operates on 1 Watt of power to produce an image with 8 lumens of brightness that can be up to about 50 inches (~127 cm) across. Such a projection engine is suitable for use with the present invention. However, continued advancements in projection technology, along with the lower resolution, lower bandwidth, lower intensity, and smaller screen size required of process transmitter displays, offers the possibility of lower power, smaller and cheaper projection engines that can be more easily and feasibly incorporated into existing products. Current and future projection engines can be mounted directly to transmitter circuitry 72 to eliminate the need for special connection hardware, such as for LCD screens, and to enable customization of displayed information.

Projector 74 is preferably mounted directly to transmitter circuitry 72 to eliminate the need for connecting individualized display modules having different electrical and mechanical interfaces. For example, LCD modules have customized connection terminals depending on the particular type of transmitter. Projector 74, however, only takes up a small portion of the surface area of transmitter circuitry 72 such that projector 74 can be integrated easily into any electronics platforms. Furthermore, existing micro-processors typically used in process transmitters are capable of controlling and operating projector 74. Thus, the same projector technology can be leveraged for all process transmitters.

Individualized display modules, such as LCD modules, have different and limited display capabilities due to their fixed display configurations. Projector 74, however, enables full customization of the display output. Software encoded into transmitter circuitry 72 can be programmed to operate projector 74 as well as to condition signals for producing image 80. The software also has complete control over all display features, content and parameters, such as which process variable to display, which units of measure to use, display update rates, and rotation orientation of the display. The software can also be programmed to display sensor signal trends with projector 74. Thus, all transmitters will also be able to share identical projection technology and software, which is able to produce an identical interface, in both appearance and function, such that customers will have familiarity and comfort across the spectrum of transmitter types. Alternatively, projector 74 can produce custom displays for special applications.

Projector 74 can also enable customization of local operator interface (LOI) hardware. For example, transmitter circuitry 72 may include an LOI in the form of button 84. In one embodiment, button 84 comprises a capacitive film touch screen. Button 84 is disposed near glass 82 such that a capacitor is formed between button 84 and glass 82, as is known in the art. Activation of button 84 by an operator, such as by touching of glass 82 in front of button 84, allows an operator to control a function of transmitter 12 or to change display 14. Transmitter circuitry 72 manipulates that portion of information 80 such that an operator is provided with an indication that button 84 is present on display 14. Furthermore, information 80 can be manipulated to indicate the function of button 84. Transmitter circuitry 72 can change the appearance of the information indicating button 84 while also changing the function that button 84 performs.

Projector 74 provides a local display means that is easily coupled to any type of transmitter circuitry architecture. Thus, projector 74 eliminates the need to develop and build platform-specific, transmitter-specific or sensor-specific display modules, thereby reducing engineering, manufacturing and production costs. Projector 74 can be controlled by transmitter electronics running software routines that permit the image generated by projector 74 to be completely customized for general and specific applications. Thus, projector 74 allows users to assert greater control over the transmitter locally without the use of extra equipment, such as a field communicator. Projector 74 also expands the ability to receive information locally at the site of the transmitter.

Figure 4:
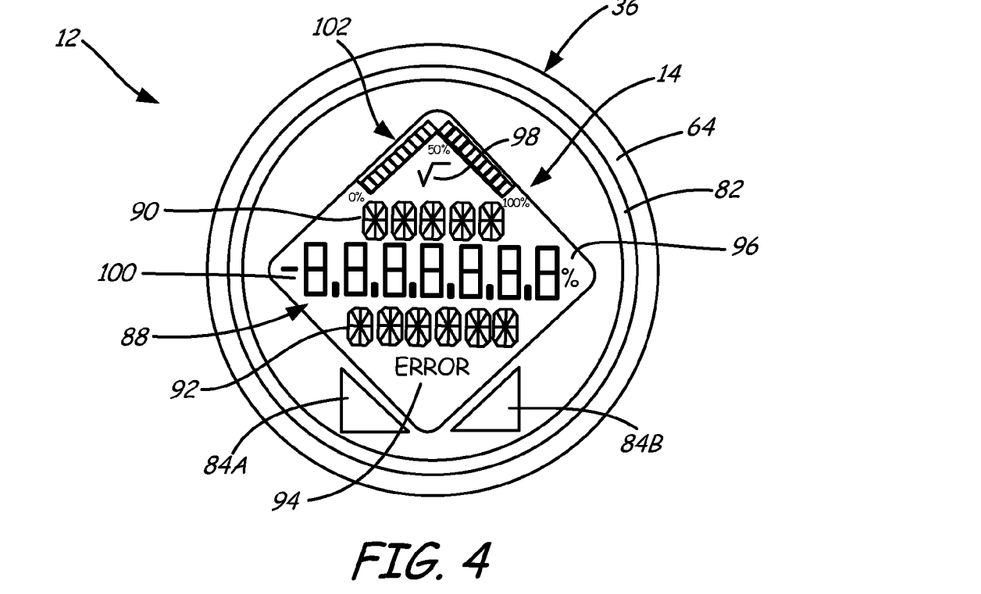
FIG. 4 is a front view of a transmitter having an image projector that mimics LCD indicators to show process transmitter function information.

FIG. 4 is a front view of transmitter electronics module 36 having projected instrument display 14 mimicking LCD indicators to show process transmitter function information. Projector 74 is disposed within transmitter electronics module 36 behind glass 82 of display cover 68 (not shown). Projector 74 produces a projected image light source that impacts glass 82 to produce information on display cover 68. The information is incident on coating 86 applied to the interior or inner surface of glass 82 to provide a visual means for receiving information relating to functioning of transmitter 12. For example, display 14 may show information relating to the output of process variable sensors, such as pressure sensor 58 of FIG. 2. Display 14 may also show information as to the operation of transmitter 12, such as by indicating the function of buttons 84A and 84B.

In FIG. 4, display 14 is programmed by transmitter circuitry 72 to display an image that emulates a conventional LCD module. In one embodiment, display 14 mimics display output described in U.S. Pat. No. 7,134,354 to Nelson et al., which is assigned to Rosemount Inc. For example, display 14 shows seven-digit numeric display 88 across a middle portion of glass 82. Five-digit alpha-numeric display 90 and six-digit alpha-numeric display 92 are disposed above and below display 88, respectively. Alpha-numeric displays 90 and 92 can be used to indicate information such as the type of process variable being displayed (pressure, temperature, etc.) while numeric display 88 can be used to indicate the magnitude of the process variable. Displays 88-92 are surrounded by various other information, such as ERROR message 94, percent symbol 96, square root symbol 98, minus symbol 100 and bar graph 102. Display 14 can also be used to provide an indication as to the function of buttons 84A and 84B. As such, display 14 can be manipulated to show information that are familiar to users of transmitter 12. The look of display 14 can thus be reproduced across all transmitter platforms, as the shape and position of display 14 is independent of the configuration of transmitter circuitry 72. Additionally, display 14 can be reproduced independent of the exact position of projector 74 on transmitter circuitry 72 so long as the projected light can cover glass 82.

Output of display 14 is controlled by circuitry 72 and can be initiated by automatic routines, or by user input. For example, an operator can use control room 14 or a field communicator to manipulate display 14. The output of displays 88-92 and information 94-102 can be controlled by software running on transmitter circuitry 72. For example, the rate at which display 14 updates displays 88-92 can be controlled by circuitry 72. Also, the orientation of display 14 with respect to housing 64 of module 36 can be changed by circuitry 72 depending on how transmitter 12 is connected to the process. Furthermore, the units of measurement indicated by alpha-numeric displays 90 and 92 can be changed by circuitry 72. The overall look and feel of display 14 can be updated by circuitry 72, which itself can be updated with new software, to change display 14 as industry and customer needs evolve. Alternatively, display 14 can be toggled to change between different displays, such as between the conventional display of FIG. 4 and more application-specific or information-specific displays, such as that of FIG. 5.

Figure 5:
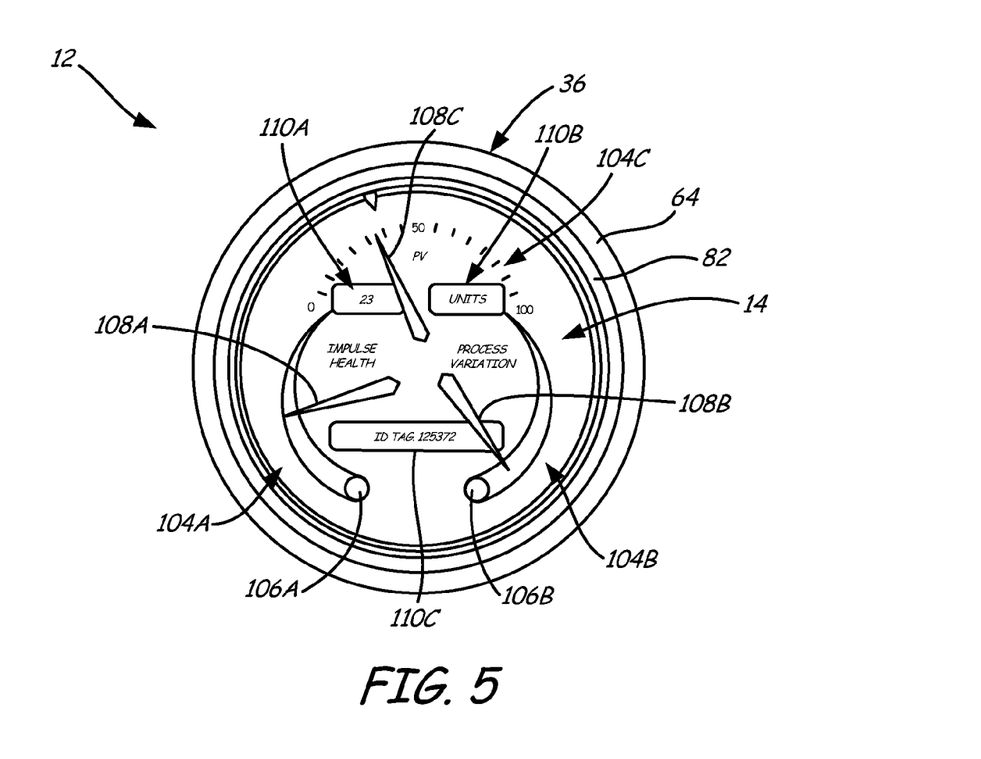
FIG. 5 is a front view of a transmitter having an image projector that mimics analog indicators to show process transmitter function information.

FIG. 5 is a front view of transmitter electronics module 36 having projected instrument display 14 mimicking analog indicators to show process transmitter function information. Similar to FIG. 4, projector 74 is disposed within transmitter electronics module 36 behind glass 82 of display cover 68 (not shown) to produce information of display 14. Display 14 comprises information projected onto glass 82 of display cover 68. The information is incident on coating 86 applied to the interior or inner surface of glass 82 to provide a visual means for receiving information relating to functioning of transmitter 12. In FIG. 5, display 14 is programmed by transmitter circuitry to display an image that simulates various analog displays. In one embodiment of the invention, display 14 mimics display output described in U.S. Pat. No. 7,222,049 to Schumacher, which is assigned to Rosemount Inc. Display 14 includes bar graphs 104A-104C, LED indicators 106A and 106B, analog indicators 108A-108C, and text indicators 110A-110C. FIG. 5 illustrates the versatility of information that may be obtained with projector 74. Specifically, projector 74 enables the output of display 14 (e.g. information 80 of FIG. 3) to be completely customized for each transmitter, including for different operating modes of the transmitter, while being produced from a module that can be incorporated into electronics platforms of any transmitter. Instead of the having to design and manufacture transmitter-specific displays that require various hardware elements (such as dials, needles, LED indicator, connection terminals and the like), which is expensive, projector 74 can be used with any transmitter electronics architecture to project any desirable image.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process transmitter for measuring a process variable, the process transmitter comprising:
    a first process sensor for measuring a process variable of an industrial process and generating a sensor signal;
    transmitter circuitry connected to the first process sensor and configured to operate functions of the process transmitter;
    a housing having a window; and
    an image projector connected to the transmitter circuitry, the image projector configured to emit light to project an image of information parameters relating to functions of the process transmitter onto the window in the housing.

2. The process transmitter of claim 1 wherein the housing further comprises:
    a meter cover containing the window, the meter cover being disposed adjacent the projector such that the information parameters are projected onto the window.

3. The process transmitter of claim 2 wherein the image projector includes a projection engine selected from the group consisting of: a liquid crystal display microchip, a light emitting diode microchip, a laser and a micro-electro-mechanical system.

4. The process transmitter of claim 3 and further comprising:
a coating applied to an interior surface of the window of the meter cover.

5. The process transmitter of claim 4 wherein the coating comprises a double lentricular screen.

6. The process transmitter of claim 2 wherein the meter cover is removable from the housing such that the projected information parameters can be projected outside of the housing.

7. The process transmitter of claim 2 wherein the image projector projects information parameters relating to the sensor signal.

8. The process transmitter of claim 7 wherein the transmitter circuitry is configured to alter the information parameters relating to the sensor signal.

9. The process transmitter of claim 8 wherein the information parameters are is selected from the group consisting of: units of measure, sensor signal trends and update rates.

10. The process transmitter of claim 8 wherein the transmitter circuitry is configured to change the display orientation of the information parameters.

11. The process transmitter of claim 2 wherein the transmitter circuitry further comprises:
a capacitive film touch screen and wherein the image projector is able to vary visual appearance of the capacitive film touch screen through the window.

12. The process transmitter of claim 1 and further comprising:
a second process sensor in communication with the transmitter circuitry and wherein the image projector is able to change appearance of the information parameters to include information parameters relating to the first process sensor and information parameters relating to the second process sensor.

13. The process transmitter of claim 1 wherein the information parameters are selected from the group consisting of: numeric indicia, alpha-numeric indicia, text indicia, bar graph indicia and analog indicia.

14. The process transmitter of claim 1 wherein the window is separated from the transmitter circuitry such that the image projector projects the image of information parameters across a gap between the window and the image projector.

15. An electronics module for an industrial process transmitter, the electronics module comprising:
transmitter electronics including circuitry and programming configured to receive a process sensor signal and to communicate the sensor signal over a control loop protocol;
a projector engine coupled to the transmitter electronics to receive the process sensor signal and to project an illuminated image of a parameter relating to the process sensor signal; and
a window onto which the illuminated image of the parameter is projected such that a visual indication of the process sensor signal is visible.

16. The electronics module of claim 15 and further comprising:
a housing containing the transmitter electronics and the projector engine, the housing including a removable meter cover in which the window is disposed.

17. The electronics module of claim 16 wherein the projector engine is selected from the group consisting of: a liquid crystal display microchip, a light emitting diode microchip, a laser and a micro-electro-mechanical system.

18. The electronics module of claim 17 and further comprising:
a rear projection screen applied to an interior surface of the window.

19. The electronics module of claim 18 wherein the rear projection screen comprises a double lentricular screen.

20. The electronics module of claim 16 wherein the projector engine projects information indicia relating to the sensor signal and the transmitter electronics is configured to alter content of the information indicia relating to the sensor signal.

21. The electronics module of claim 16 wherein the transmitter electronics further comprises:
a capacitive film touch screen and wherein the projector engine varies visual appearance of the capacitive film touch screen through the window.

* * * * *